Patented Feb. 15, 1949

2,462,049

UNITED STATES PATENT OFFICE 2,462,049

PENTAERYTHRITOL CONVERSION

Joseph A. Wyler, Allentown, Pa., assignor to Trojan Powder Company, a corporation of New York No Drawing. Application May 10, 1946, Serial No. 668,775

4 Claims. (Cl. 260—615)

This invention relates to a method of forming condensation products of pentaerythritol.

In my copending application Serial No. 665,321 entitled Pentaerythritol condensation products and filed April 26, 1946, now patent 2,462,047, I have described a method of forming condensation products from pentaerythritol and its lower condensation products such as di- or tri-pentaerythritol by heating the pentaerythritol compound with a small proportion of a selected acid. It is there shown that such heating gives a different type of reaction from those obtained by similar treatment of other polyhydric alcohols such as glycerine or glycol.

In attempting to use dehydrating salts to effect the condensation of a pentaerythritol compound I have found that one of the most widely used of such salts, zinc chloride, is ineffective. Stannic chloride also is ineffective. On the other hand, I have found good results with stannous chloride and with a limited number only of other salts, all of these other salts being normally no stronger in their dehydrating action if any than zinc chloride, for instance, which failed to work in the present method.

Briefly stated, the invention comprises the method of making condensation products which comprises forming a mixture of a pentaerythritol compound, such as mono-, di-, or tripentaerythritol, with a minor proportion of a salt selected from the group consisting of stannous chloride, cadmium chloride, aluminum sulfate, aluminum chloride, and lead chloride, heating the mixture at an elevated temperature causing evolution of water from the pentaerythritol compound at a substantial rate, and continuing the heating until test shows lowering of the hydroxyl content of the remaining organic material to that desired in the finished condensation product. In an illustrative embodiment, the invention comprises heating a pentaerythritol compound with stannous chloride, in the proportion of about 0.5% to 5% of the weight of the mixture with the compound, to a temperature of about 220° to 265° C. for a period of 20 to 180 minutes.

For the more convenient correlation of the percentage of hydroxyl in the resulting product with the extent of condensation which occurs during the heating, there is quoted below a table from the said copending application.

*Constants of pentaerythritols*

| Type | Empirical Formula | Molecular Weight | Per Cent OH | Number of OH Groups |
|---|---|---|---|---|
| Mono-Pentaerythritol | $C_5H_{12}O_4$ | 136.15 | 49.98 | 4 |
| Di-Pentaerythritol | $C_{10}H_{22}O_7$ | 254.30 | 40.13 | 6 |
| Tri-Pentaerythritol | $C_{15}H_{32}O_{10}$ | 372.41 | 36.53 | 8 |
| Tetra-Pentaerythritol | $C_{20}H_{42}O_{13}$ | 490.54 | 34.67 | 10 |
| Penta-Pentaerythritol | $C_{25}H_{52}O_{16}$ | 608.67 | 33.53 | 12 |
| Hexa-Pentaerythritol | $C_{30}H_{62}O_{19}$ | 726.80 | 32.76 | 14 |
| Hepta-Pentaerythritol | $C_{35}H_{72}O_{22}$ | 844.93 | 32.21 | 16 |
| Octa-Pentaerythritol | $C_{40}H_{82}O_{25}$ | 963.06 | 31.79 | 18 |
| Nona-Pentaerythritol | $C_{45}H_{92}O_{28}$ | 1,081.19 | 31.46 | 20 |
| Deca-Pentaerythritol | $C_{50}H_{102}O_{31}$ | 1,199.32 | 31.20 | 22 |

In general, the method of the invention includes mixing the selected pentaerythritol compound with one of the salts listed above, heating the product until the pentaerythritol compound selected as the raw material melts unless originally a liquid and reaches the temperature at which, in contact with the salt, water is liberated from the said compound at a substantial rate. This means that the temperature is raised until the rate of reaction is so rapid that the desired amount of water is liberated and attendant condensation occurs in a period of time that is acceptable commercially, ordinarily a few hours or less. Heating is then continued at about this temperature until specimens removed for analysis, by a conventional quantitative test for hydroxy content, shows the reduction of the hydroxy content to that corresponding to the content of hydroxy groups in the pentaerythritol condensation product desired. The heating is then discontinued.

In correlating the hydroxy content of the mixed product with the formula for the pentaerythritol conversion product present, correction is made for the small proportion of inorganic salt present, as will be readily understood by those familiar with chemical analyses and calculations.

An advantage of the condensation with added salts over the method using acid, as described in my said copending application, is the fact that for a given temperature of heating less discoloration is produced when the condensation catalyst is one of the salts described herein than when it is sulfuric acid, for example.

As the pentaerythritol compound to be used there is suitably used one that is a solid at room temperature, that is, pentaerythritol itself or one of the lower condensation products either di-penta- or tripentaerythritol. Also there may be used mixtures of any of these lower pentaerythritol compounds.

The proportion of the salt used as the catalyst or accelerator of the condensation may be varied, the larger the proportion of the salt used the lower would be the temperature or the shorter the time of heating or both which is required to give condensation to any desired extent. Suitable proportions of salts that may be used are 0.3% to 10% of the weight of the mixture with the pentaerythritol compound, and preferably about 0.5% to 5%. For most commercial condensations I use 1% to 3% of the salt; such proportions give a satisfactorily rapid condensation at the temperatures used without introducing undesirably large proportions of the salts or increasing greatly the discoloration.

Times of heating vary from a few minutes to a few hours, ordinarily between 20 minutes and 180 minutes at the selected elevated temperatures.

Temperature and time of heating and proportion of the salt used are factors affecting the extent of condensation. As any one of these is increased, the others may be reduced correspondingly for a given extent of condensation required.

The condensation product made is a mixture of (1) large proportions of polypentaerythritols, the various compounds up through the deca that may be formed being shown in the above table, (2) epoxy-tetramethylolmethane or its polymers, and (3) a small proportion of the unchanged pentaerythritol, dipentaerythritol, or like compound used originally.

The resulting mixture of polypentaerythritols may be used as such. It has been found that the mixture, containing suitably about 26% to 44% of hydroxy group content, is useful in making quickly bodying resins when warmed with drying oil fatty acids, rosin, talloil, and the like.

The invention will be further illustrated by description in connection with the following specific examples.

*Example 1*

200 parts of a mixture consisting of 95% pure pentaerythritol and 5% stannous chloride crystals were heated in a vessel provided with a stirrer, at a temperature of about 233°–241° C. for about 35 minutes. Water was liberated to the extent of about 5% of the weight of the charge.

The contents of the vessel were discharged into a cooling pan and cooled. This product contained 40.85% OH and had a good color.

*Example 2*

200 parts of a mixture consisting of 98% pure pentaerythritol and 2% stannous chloride crystals were heated in essentially the same manner as in Example 1. The mixture, in this case, was held at 225°–236° C. for 100 minutes. Approximately 20 parts of water were driven off. This corresponds to a loss of approximately 9.9% of water on the weight of the whole mixture.

The final product contained 34.06% OH and had a good color.

*Example 3*

200 parts of a mixture consisting essentially of 99% pure pentaerythritol and 1% of stannous chloride crystals were heated in about the same manner as in Example 1. In this case the mixture was held at 237°–246° C. for 45 minutes. 10 parts of water were driven over.

The final product contained 39.97% OH and had an excellent color.

In a second run in which the length of time of heating was 90 minutes instead of the 45 minutes, the hydroxyl content was reduced to 37.52%.

*Example 4*

200 parts of a mixture consisting essentially of 99.5% of pure pentaerythritol and 0.5% stannous chloride crystals were treated as under Example 1, except that the temperature was maintained at about 245°–258° C. for one hour.

The final product had a good color and contained 40.96% OH.

In two additional runs in substantially the same manner, the hydroxyl contents of the products were 41.16% and 41.02% respectively.

In an additional test in which the temperature was held at 250°–254° C. for 3 hours, the hydroxyl content of the final product was 25.24%; and in still another test, in which the temperature was held at 205°–241° C. for 198 minutes, the hydroxyl content was 39.81%.

*Example 5*

A mixture consisting of about 86% pentaerythritol, 13% dipentaerythritol and 1% stannous chloride crystals was processed essentially as under Example 1, except that the mixture was held at 242°–261° C. for 35 minutes.

The final product had a good color and contained 43.82% OH as against 47.64% OH for the original mixture of P. E. and D. P. E.

*Example 6*

A mixture consisting essentially of 99% of pure dipentaerythritol and 1% of stannous chloride crystals was heated at 248°–254° C. for one hour.

The final product contained 35.81% OH as compared to 40.0% OH for the original material.

*Example 7*

A mixture consisting essentially of 99% of tripentaerythritol and 1% of stannous chloride crystals was treated generally as under Example 1, the mixture being held at 230°–243° C. for one hour.

The final product contained 30.14% OH as compared to 36.5% OH for the original material.

*Example 8*

196 parts of pure pentaerythritol were mixed with 4 parts of cadmium chloride crystals and the mixture heated, with stirring. The mixture melted at 225° C., took on the appearance of "boiling" at 240° C. and lost water rapidly at 250° C. The temperature was held at 250°–255° C. for 45 minutes. This caused the liberation of 12 parts of water. The final product, upon cooling, was soft, but not sticky or gummy, and contained 39.80% OH.

*Example 9*

196 parts of pure pentaerythritol were mixed with 4 parts of aluminum sulfate crystals and treated as under Example 8. The mixture melted at about 190° C. and liberated water at 220° C. The temperature was raised to 225° C. and held here for 20 minutes.

The final product contained 36.13% OH.

Example 10

Using hydrated aluminum chloride

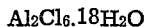

in place of the aluminum sulfate a higher temperature was required to effect the dehydration reaction. A temperature of 245°–250° C. was required for 20 minutes to drive off 12 parts of water.

This final product contained 39.90% OH.

Example 11

196 parts of pure pentaerythritol were mixed with 4 parts of lead chloride and the mixture treated as under Example 8. The mixture began to melt at 200° C. and required a temperature of 250°–255° C. to drive off water. The mixture was held at this temperature for 45 minutes. 14 parts of water were driven off.

The final product contained 38.08% OH.

Products made as described are generally light in color. If it is desired to remove or lessen the small amount of color which is obtained, then the products after the heating may be treated with decolorizing carbon and filtered at such a temperature or with a solvent so that the condensation product is in liquid form.

It will be understood also that it is intended to cover all changes and modifications of the example of the invention herein chosen for the purpose of illustration which do not constitute departures from the spirit and scope of the invention.

What I claim is:

1. In making condensation products of pentaerythritol, the method which comprises forming a mixture of a compound selected from the group consisting of pentaerythritol, dipentaerythritol and tripentaerythritol with a salt selected from the group consisting of stannous chloride, cadmium chloride, aluminum sulfate, aluminum chloride and lead chloride in the proportion of 0.3 to 10 parts for 100 parts by weight of the said mixture, heating the mixture to a temperature of 220° to 265° C. to cause evolution of water from the said compound and continuing the heating until the amount of water evolved is 5 to 9.9 parts for 100 parts by weight of the said compound.

2. The method described in claim 1, the said salt being stannous chloride.

3. The method described in claim 1, the period of heating being 20 to 180 minutes.

4. The method of making a condensation product of pentaerythritol which comprises forming a mixture of pentaerythritol with a salt selected from the group consisting of stannous chloride, cadmium chloride, aluminum sulfate, aluminum chloride and lead chloride in the proportion of 0.3 to 10 parts for 100 parts by weight of the said mixture, heating the mixture to a temperature of 220° to 265° C. and continuing the heating until the hydroxyl content of the product is lowered to between 26% to 44% of the weight of the remaining organic material.

JOSEPH A. WYLER.

REFERENCES CITED

The following references are of record in the file of this patent:

UNITED STATES PATENTS

| Number | Name | Date |
|---|---|---|
| 2,110,695 | Batchelder | Mar. 8, 1938 |
| 2,275,494 | Bennett | Aug. 1, 1939 |
| 2,334,565 | Lieber et al. | Nov. 16, 1943 |
| 2,401,749 | Burghardt et al. | June 11, 1946 |

OTHER REFERENCES

Burrell et al., "Paint, Oil & Chemical Review," vol. 107, No. 24, pages 14 to 20. (Issue of Dec. 14, 1944.)